United States Patent
Smith et al.

[19]

[11] Patent Number: 6,167,521
[45] Date of Patent: Dec. 26, 2000

[54] SECURELY DOWNLOADING AND EXECUTING CODE FROM MUTUALLY SUSPICIOUS AUTHORITIES

[75] Inventors: Sean William Smith, Cornwall, N.Y.; Steve Harris Weingart, Boca Raton, Fla.

[73] Assignee: International Business Machines Corporation, Armonk, N.Y.

[21] Appl. No.: 08/920,814

[22] Filed: Aug. 29, 1997

[51] Int. Cl.[7] ....................................................... G06F 11/30
[52] U.S. Cl. ............................ 713/200; 380/286; 705/64; 705/67; 705/71; 709/230; 709/237; 717/11; 713/150; 713/168; 713/180
[58] Field of Search ..................................... 713/200, 150, 713/168, 180; 395/652, 653, 712, 704, 186; 364/280; 380/4, 21, 286; 709/300, 303; 345/440; 705/64, 67, 71

[56] References Cited

U.S. PATENT DOCUMENTS

| | | | |
|---|---|---|---|
| 4,218,582 | 8/1980 | Hellman et al. | 178/22 |
| 5,057,996 | 10/1991 | Cutler et al. | 364/200 |
| 5,412,717 | 5/1995 | Fischer | 380/4 |
| 5,493,682 | 2/1996 | Tyra et al. | 395/700 |
| 5,557,518 | 9/1996 | Rosen | 304/408 |
| 5,808,625 | 9/1998 | Picott et al. | 345/440 |
| 5,825,877 | 10/1998 | Dan et al. | 380/4 |
| 5,852,666 | 12/1998 | Miller et al. | 380/4 |
| 5,929,864 | 7/1999 | Picott et al. | 345/440 |
| 6,058,478 | 5/2000 | Davis | 713/191 |
| 6,088,797 | 7/2000 | Rosen | 713/173 |

FOREIGN PATENT DOCUMENTS

| | | |
|---|---|---|
| WO 98/43212 | 10/1998 | WIPO . |
| WO 99/16031 | 4/1999 | WIPO . |

OTHER PUBLICATIONS

Federal Information Processing Standards Publication, Security Requirements For Cryptogra. Modules, US Dept. of Commerce, Jan. 11, 1994, FIPS PUB 140–1, p. 1–56.
Schneier, Applied Cryptography, 2nd edition, p. 185–186, Oct. 1995.

*Primary Examiner*—Tod R. Swann
*Assistant Examiner*—Paul E. Callahan
*Attorney, Agent, or Firm*—Louis P. Herzberg

[57] ABSTRACT

An apparatus, system and method for secure code-downloading and information exchange, in the full generality of complex code dependencies while considering the implications of mutual distrust and hot-swapping. Included are secure techniques wherein an authority signs code from another party upon which that authority depends in order to establish that a trusted execution environment, is being preserved. Trusted code is employed to ensure that proprietary data is destroyed, disabled, and/or made unreadable, when a change causes the trusted execution environment to cease holding to a certain security level. A carefully constructed key structure is employed to ensure that communications allegedly from particular code in a particular environment can be authenticated as such. Authenticity of code that decides the authenticity of public-key signatures, and/or the authenticity of other code is cared for. In particular, the loading code that performs these tasks may itself be reloadable. Authenticity is maintained in physically secure coprocessors with multiple levels of dependent software that is independently downloadable by mutually suspicious authorities, and in physically secure coprocessors whose software has sufficient richness and complexity so as to be certainly permeable. Recoverability is provided for physically secure coprocessors from code of arbitrary evil running at arbitrary privilege.

61 Claims, 11 Drawing Sheets

*Device:*

SECURELY DOWNLOADING AND EXECUTING CODE FROM MUTUALLY SUSPICIOUS AUTHORITIES

CROSS REFERENCES

The present application is related to the following applications even dated herewith: entitled, "Establishing and Employing the Provable Integrity of a Device", by inventors S. W. Smith et al., assigned application Ser. No. 08,920,815 with a filing date of Aug. 29, 1997; entitled, "Hardware Access Control Locking", by inventors T. A. Cafino et al.; entitled "Authentication for Secure Devices With Limited Cryptography", by inventors S. M. Matyas et al., assigned application Ser. No. 08,921,442 with a filing date of Aug. 29, 1997, which are incorporated herein by reference.

FIELD OF THE INVENTION

The present invention is directed to the field of information security. It is more specifically directed to secure information exchange.

BACKGROUND OF THE INVENTION

Computer systems require programs (also known as code) in order to function. As time goes on, new code needs to be installed, and existing code needs to be updated or deleted. In practice, scenarios arise where these changes occur in a somewhat or completely automatic fashion. This is often under the control of someone who is not the direct user of the system, and who is remotely connected to the system via a network or some other means. In these scenarios, this process is called code downloading [or code loading].

As an example, consider a secure coprocessor such as a high-end smart card. Such a device is a small computer system designed to be secure and robust against attack by potentially hostile users or other parties. This security requirement complicates the problem of code installation and update in that code downloading needs to occur only when permitted by an appropriate authority often not colocated with the card. Furthermore, the smart card itself might be physically encapsulated to prevent tamper. This encapsulation generally prevents any maintenance access besides via the computer I/O. It is even difficult to even know how to tell with certainty as to what really is loaded in the card.

It is recognized that a smart card dedicated to a single application might have a simple code structure for enabling permanent code downloads, and to restart a single unit of application code. However, a general-purpose computer (GPC) system introduces more complications in that the code structure is usually very complex. Thus, permanent code in a GPC might support several layers of downloadable code. These may include the program or code that does the downloading, the operating system, and one or more applications. Furthermore, each piece of code might be controlled by a different authority. Since these programs are designed for long-lived operation, code-downloading should preserve the state associated with the execution of existing code. This may include even the code that is being replaced and/or updated.

Code downloading raises two fundamental security issues. Firstly, how to prevent the new code from attacking code that is already installed in the system. Secondly, how to prevent code that is already installed in the system from attacking the new code.

Consideration of general-purpose computer systems raises the additional challenge of providing these properties in a fully general context. This includes conditions when the structure of downloadable code on the system can be fairly complex (and include very fundamental code), and when this structure might include different code-owners who might not trust each other. This has to be accomplished while preserving the operational state of the code whenever possible and reasonable.

Most previous work addresses downloading only for a single level of application code. This is the situation for code-signing work which protects a system from downloaded application code by having developers sign their own code so as to establish its origin. It is also so, for a technique which allows a single application to be downloaded from the same authority that controls the system while additionally having options to retain application state and to somewhat protect the application from a rogue system.

A system may support downloading a linear hierarchy of code. However, replacing one level of code often requires erasing everything associated with that level and above. Furthermore, this approach does not protect the various programs from each other.

SUMMARY OF THE INVENTION

One aspect of this invention is to provide secure code-downloading in the full generality of complex code dependencies while considering the implications of mutual distrust and hot-swapping, using security and authentication methods. In particular, systems, methods and structures are presented wherein:

an authority signs code from another party upon which that authority depends in order to establish that a 'trusted execution environment' is being preserved;

code is used that is already trusted to ensure that proprietary data is destroyed, disabled, and/or made unreadable, when a change causes the trusted execution environment to cease holding to a certain security level;

a carefully constructed key structure is employed to ensure that communications allegedly from particular code in a particular environment can be authenticated as such;

the authenticity and reloadability of code that decides the authenticity of public-key signatures, and/or the authenticity of other code is cared for;

the authenticity is maintained in physically secure coprocessors with multiple levels of dependent software that is independently downloadable by mutually suspicious authorities, and in physically secure coprocessors whose software has sufficient richness and complexity so as to be almost certainly permeable; and recoverability is provided for physically secure coprocessors from code of arbitrary evil running at arbitrary privilege.

Still an other aspect of the present invention provides a method for a node's authority to download new code into an existing node within a device. The method comprising the following steps: the authority preparing a command message including the new code, load predicates and trust parameters; the authority communicating the command message to the device; the device receiving the command message; the device verifying a source of the message and a current execution environment being valid for the load predicates; and downloading the code if the source is verified to be the authority and the load predicates are valid, and not loading the code otherwise.

In some embodiments wherein the existing node has at least one descendent node, the method further comprises: evaluating for each the descendent node a change in an environment of the existing node resulting from the step of loading by comparing the environment against stored trust parameters for the descendent node; determining if the change is acceptable for the trust parameters and; executing the code if the step of determining proves the change to be acceptable, or clearing sensitive data from the descendent node otherwise. These may further include the steps of the device adjusting at least one of its outgoing authentication keys to reflect the change, and the device erasing an original outgoing authentication key of the descendent node; and the device generating and certifying a new outgoing authentication key for the descendent node, and/or the device generating at least one receipt attesting to the change, and/or authenticating the receipt using an outgoing authentication technique of the existing node.

Another aspect of the present invention is a method for an authority of a parent node in a device to create a child node of the parent node. The method includes the steps of: the parent authority preparing a create child command for the device, the command including command predicates; the authority sending the command to the device; the device receiving the create child command; the device verifying a source of the command; the device creating the child if the predicates are satisfied and the source is the parent authority, otherwise not creating the child.

Still another aspect of the present invention is a method for a device which has a security dependency graph to regenerate an outgoing authentication key for a first node. The first node has at least one ancestor with public-key ability, the method comprising: the device generating a new keypair for the first node; the device selecting the ancestor for its outgoing authentication technique; the device composing a certificate for a new outgoing public key of the first node, the certificate includes the new outgoing public key the first node; identifying an authority over each descendent node in the security dependency graph; identifying code currently held in the descendent node; signing the certificate with a current outgoing private key of the ancestor; saving the new public key for the first node and saving the certificate in an appropriate memory; and atomically making the new keypair the active pair for the first node while deleting the old private key.

Still another aspect of the present invention is a method for a device to respond to a first command. The device has a NODE-A and a NODE-B. NODE-A is under the control of a NODE-A authority. NODE-B is under the control of a NODE-B authority. The first command is a request made by the authority of NODE-A which is an ancestor of NODE-B. The method comprising the following steps. The NODE-B authority selects a command authentication technique, generates new incoming authentication secrets; and communicates at least part of the secrets to the NODE-A authority. The NODE-A authority authenticates that the communication originated with the NODE-B authority, and prepares an emergency certificate. The emergency certificate includes a first identification of the NODE-B authority, the selected command authentication technique, and an appropriate part of secrets of the NODE-B authority. It then communicates the emergency certificate to the device to enable the device to respond to the first command.

Still another aspect of the present invention is a computer system comprising: a processor; a memory for storing instructions and data for the processor; a communication channel for exchanging message signals between the processor and external devices; an authenticator for determining whether incoming message signals to the processor are authorized by a trusted authority; a security manager for authorizing the loading of a new program into the memory only if the authenticator determines that the new program is authorized by a trusted authority. In some embodiments the system includes an operating system or application program in the read/write memory. The operating system or application program is dependent on the loader. The new program is "dependent" on both the loader and the operating system or application program. The trusted authority includes in combination a first influence of a first authority over the loader and a second influence of a second authority over the operating system or application program. Thus an authority controls the loading of the new program. But this loading and its execution depend on two other programs, each controlled by their own authority. In this way these authorities in combination have influence over the trusted environment of the new program.

BRIEF DESCRIPTION OF THE DRAWINGS

These and other objects, features, and advantages of the present invention will become apparent upon further consideration of the following detailed description of the invention when read in conjunction with the drawing figures, in which.

PRINCIPLES OF THE INVENTION

The following are definitions of terms and objects as used herein. Firstly, a security dependency graph (SDG) is employed in order to discuss a computer system with hierarchically dependent code. An SDG models the security dependencies in computer systems. A SDG is a directed acyclic graph where each node represents a program. As used herein, a node is a logical subregion of a device which is directly controlled by a single authority, and which includes elements such as a data store and a program store. Thus a 'program-A' is at NODE-A, a 'program-B' is at NODE-B, and so on. In the SG, a connecting line (edge) from a first node to a second node terminated in an arrow at the second node, represents a direct security dependency of the first node on the second node. The dependency is such that the secure and trusted operation of the program in the first node depends on the secure and trusted operation of the second node. The second node is said to be a parent-node of the first node. The first node is said to be a child-node of the second node.

Figure 1A:
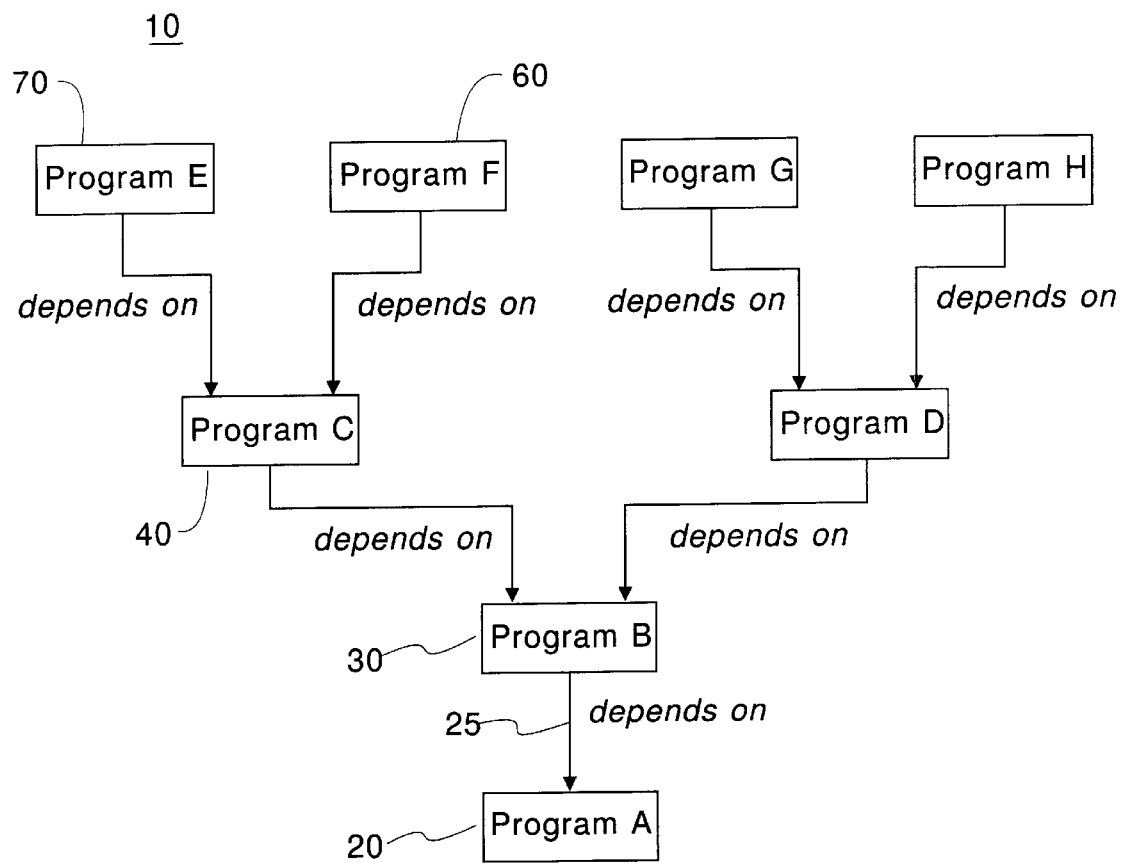
FIG. 1A shows a simple example of a security dependency graph.

FIG. 1A shows a simple example of a security dependency graph 10. It shows a line 25 running from NODE-B 30 to NODE-A 20 with an arrow at NODE-A 20. This represents a direct security dependency of NODE-B 30 on NODE-A 20, such that the secure and trusted operation of Program-'B', running in NODE-B 30, depends on the secure and trusted operation of Program-'A', running in NODE-A 20. NODE-A 20 is said to be a parent-node of NODE-B 30. NODE-B 30 is said to be a child-node of NODE-A 20. Similarly, the secure and trusted operation of Program-'F' on NODE-F 60 depends on the secure and trusted operation of NODE-C 40. The secure and trusted operation of Program-'C' depends on the secure and trusted operation of NODE-B 30. The secure and trusted operation of Program-'E' 70 also depends on the secure and trusted operation of NODE-C 40. Actually, NODE-A 20 is the ancestor-node of all the nodes shown in FIG. 1A. NODE-A is also referred to as the root node. In a directed acyclic graph, a node which is an ancestor of all the other nodes is called the root.

It is herein assumed that dependency also implies information flow from child to parent. Arrows connect children to their parents. In particular, if 'B' depends on 'A', then 'A' is assumed to have access to secrets that belong to 'B'. Conversely, if some NODE-X has access to critical secrets for some NODE-Y, then the SDG must contain a path from NODE-Y to NODE-X with an arrow terminating at NODE-X. Parent-nodes of parent-nodes are said to be ancestors of the children-nodes. In this way, within an SDG, the set of ancestors of a given node is said to comprise that node's "supporting software environment" or just environment. A node along with its ancestors is said to comprise that node's software execution environment.

It is noted that not all devices need to share the same SDG. Furthermore, the security dependency at any device might change with each code downloading operation. In some cases, the SDG is a tree with a root that is permanent and simple. In particular, it performs neither public-key cryptography nor hashing. The remaining nodes are all dynamic and reloadable. The root's children perform more general crypto tasks.

Several items are associated with each particular node in an SDG. Each particular node has an 'authority'. An authority is an external party responsible for that particular node. Each node might have a different authority, and the authority for a given node might change over the lifetime of that node. Each particular node has a storage place for the name of this authority, and for code which is the program at that node. It also has a storage place for storing operational data associated with the ongoing execution of the code at that node, for storing an incoming authentication key, and for storing an outgoing authentication key. The incoming authentication key is used by the system to authenticate requests from that node's authority. The outgoing authentication key is used by the code at that node to prove where it came from.

The incoming authentication key embodies the ability to authenticate that an incoming message originated at a specific authority in accordance with the standard algorithms known to those skilled in the art. For example, the key might be a shared symmetric key, or a public key. The shared secret key or the private key corresponding to the public key is generated and retained by that node's authority.

Similarly, the outgoing authentication key embodies the ability to prove that a message originated with the party which knew that key in accordance with standard algorithms known to those skilled in the art. For example, the key might be a shared symmetric key, or a private key. Sometimes, this is a private key, which is one key of a pair of keys (keypair), that is generated by execution of that node's program. The keypair is usually generated by a trusted ancestor of that node. That is, key-generation ability is given to only one node. This is often the first child of the root. This first child provides all public-key services for the remaining nodes.

Symmetric keys are used here only in a few special situations. They are used primarily when the node in question has no public-key crypto support in its software execution environment. They are also used when the node in question has public-key cryptography code, but no outgoing authentication key in the execution environment has yet been certified as trustworthy by an appropriate external party.

The general principles of the present invention requires that two central trust invariants are maintained.

Firstly, for a NODE-A to preserve its operational data, the authority over that NODE-A must trust NODE-A's software execution environment. As a consequence of this trust, any change to this environment must be trusted by the authority over NODE-A, and the code that carries out this change (and evaluates this trust) must already be in the trusted software execution environment. Secondly, the outgoing authentication key for a NODE-A binds that NODE-A to a specific software execution environment. As a consequence, any change to this environment results in this key being destroyed. If authority over NODE-A trusts this changed environment, then a new outgoing authentication key is created. In this way, NODE-A can still authenticate its outgoing messages as originating in a trusted environment. But, the receiver of these messages can use this key to distinguish between these messages and any sent by NODE-A before its environment was changed.

The presence of the incoming authentication key associated with a node allows the loader, or authenticator, to verify that an incoming command came from the authority over that node. Commands that can be authenticated this way are assumed to express the direct will of the authority. This is as opposed to commands that are never directly authenticated by the device, but only indirectly via other Authorities. In this direct way, the authority over a node creates the children for that node, and establishes the identity of the authority over each child.

It is noted that in most embodiments, the terms "loader," "authenticator," and "security manager" are user interchangeably for the same component or subdevice.

The authority over a node controls the loading of new code into that node. The authority exercices this control by using its authentication technqiue to authenticate the code to be loaded, and to authenticate a 'description' of the supporting environment it deems necessary for its code to continue to run in a trustworthy fashion. This description can take either of two forms. In one form, the description is the signed statements about the underlying computer system and the owners and code in one's ancestors. Another form of the description is the authority explicitly counter-signing new code to be downloaded into an ancestor node. Thus, in the first form, authority-A is expressing opinions about the state of the ancestors of NODE-A before NODE-A is loaded. In the second, authority-A is expressing opinions about the state an ancestor will be in after that ancestor is loaded.

Once established, the operational state associated with a node is preserved only if the execution environment either remains unchanged, or changes only in a fashion trusted by the authority of that node. The operational state and outgoing authentication keys associated with a node are not accessible to any program not in the software execution environment of that node, unless one of these programs reveals it.

The outgoing authentication key associated with a node is destroyed when any change occurs to any node in the software execution environment of that node. If the node remains runnable, then a new outgoing authentication key is recreated. For the general case when this key is a private key, it is associated with a corresponding public key which along with a description of the environment is certified, by signing with the private key of a trusted ancestor node, or by a trusted external authority. This ensures that any party trusting a particular version of a node, and particular versions of each of its ancestors, can distinguish the communications of that node IN THAT ENVIRONMENT from those of a clever adversary, including the execution of that node in a different, untrusted environment. Code that is already part of the trusted execution environment, performs the evaluation of changes and any necessary destruction of a nodes's state and secrets. Thus, if the authority over the download-evaluation code downloads a version untrusted by the authority over some descendent node, destruction of that node's secrets is completed before this version has a chance to run.

A computer system's SDG describes the state of the code in the system at any given time. Changes occur in any of two ways. In one way changes occur as a response to a specific command from an authority. In another way changes occur via a clean-up performed automatically after some type of failure, as for example for a memory failure. The principal command-driven changes are discussed herein.

Throughout the invention as implemented, when a command is carried out on a particular node, the device often generates a receipt. The receipt contains identification information about the command performed and is authenticated with the outgoing authentication key of the node or one of its ancestors. This is also doable using the outgoing authentication key that existed before any environment change due to said command occurs.

Situations exist where a first authority may be issuing a command that directly affects a first node under control of the first authority, but where the command indirectly affects a second node under control of a second authority. The second node is a descendent of the first node in the security dependency graph of this device, and the command changes the software execution environment of the second node. In such situations, the second authority may control what happens to the second node by explicitly 'counter-authenticating' the command from the first authority. This is analagous in many ways to countersigning a document. The type of countersignature, or lack thereof, on the command for the first node does not affect whether or not the command is carried out on the first node, but only on what its consequent affect will be on the second node.

In accordance with the subject invention, a new node is created as follows. The authority over NODE-A can create a child node, NODE-B, of parent NODE-A. To do this, the authority over NODE-A issues a create-child command that establishes the name of the Authority over NODE-B. The device uses the incoming authentication key of NODE-A to authenticate that this command came from the authority over NODE-A. The code, keys, and other data in 'B' are initially blank. Code is subsequently downloaded in the way that code is loaded into an existing node that does not have an incoming authentication key, using the following techniques supplemented with the 'emergency authentication' techniques discussed below. Everytime an authority downloads code, it can also download a new incoming authentication key for itself.

Loading code into an existing node, in accordance with the subject invention, is performed as follows. To update the code in an existing NODE-A, the authority over NODE-A uses its incoming authentication key: to sign and thus validate the new code; to sign and thus validate the specific requirements for the software execution environment necessary for this load to even occur; and to sign and validate the specific requirements for the supporting environment for the operational data to be maintained across future changes to the supporting environment. A load will only proceed if these specific requirements for the load to occur are satisfied. The following additional steps are performed. For each NODE-B that descends from NODE-A in the SDG, (and thus depends on NODE-A in the SDG,) a check is performed to determine if the new load for NODE-A satisfies descendent NODE-B's pre-established parameters for a trusted supporting environment. If not, the operational data associated with NODE-B and with any of its descendants are deleted. Further, whether the program at any such node is re-started or suspended until re-load, is determined by that node's trust parameters, with the exception that no program can run unless all the programs in its supporting environment are runnable. In addition, the outgoing authentication key associated with NODE-A and each of its descendants is destroyed. If such a node is still runnable, a new outgoing authentication key is recreated.

The operation of loading a new key into an existing node, in accordance with the subject invention, is performed as follows. A new incoming authentication key in an existing NODE-A is validated by, the authority over NODE-A using its current incoming authentication key to sign the new key.

In accordance with the subject invention, a node is destroyed as follows. An authority over a NODE-A can cause its destruction by signing an appropriate command with its incoming authentication key. In this case, the descendants of NODE-A are deleted and/or destroyed as well.

In accordance with the subject invention, an emergency operation is performed as follows. When the authority over a NODE-A somehow loses its ability to authenticate changes, a back-up emergency method is implemented. In this situation, an authority over a NODE-B that is an ancestor of NODE-A can sign a new incoming authentication key for the authority over NODE-A. However, this option creates a potential 'backdoor' that the authority over NODE-B might use to gain unauthorized access to the code and data at NODE-A. For example, the device must take Authority-B's word regarding the identity and will of Authority-A. To keep such backdoors from being useful, the following precautions are taken. The operational data and/or runnability of NODE-A is preserved only if the trust parameters pre-established by the authority over NODE-A indicate that this authority trusted this type of emergency action. For each descendent NODE-C of NODE-A, the operational data and/or runnability of NODE-C is preserved only if the trust parameters pre-established by the authority over NODE-C indicate that this authority trusted this type of emergency action to be taken by the authority over NODE-B to act on NODE-A.

As discussed briefly above, one implementation of the present invention constrains the SDG to a tree, with a permanent simple root, which has one child. The root only needs to reload the child under emergency circumstances. The remainder of the downloading and SDG tasks are directed by this child. Although the incoming key structure is hierarchical, this implementation performs decision and installation for code downloading in one central place in order to simplify a number of tasks. In another embodiment hierarchical loading is used in a straightline graph, such that each node loads the next level's child.

In order to facilitate interaction with some hardware security techniques, all changes might best be performed at boot time. The implementation of the present embodiment also takes care to make sure that all changes occur atomically, and that failures are handled gracefully and appropriately. A change occurs atomically if it either takes place completely or not at all.

The loading trust invariant requires that a node maintain operational data only in a trusted software execution environment. Should the environment cease to be trusted, the invariant permits several options. These options include the node and its data are deleted; or the node and its runnability are preserved, but its data is deleted; or the node is preserved, but its runnability and data are deleted; or the node and its data are preserved, but its runnability and/or the access to its data from its supporting environment is suspended. The implementations presented herein carry out variations on the middle two options.

The use of outgoing authentication keys establishes that a message came from a specific version of code within a specific software execution environment. However, this property follows from the invariant that the key for a node in a given software execution environment can be trusted to be confined to that environment. In one embodiment this is achieved as follows. The loader is reloadable and signs an outgoing key for its sole child, who in turn signs items on behalf of all its descendants. The reloadable loader also signs a new outgoing key for itself, before the reloadable loader is itself reloaded. An external trust source for the initial reloadable loader is established.

Other embodiments may be implemented. If one imagines the SDG graph extended across time, the approach of the present embodiment brings the trust path for a signature down the SDG graph to the minimal node with public-key capabilities, then back in time to a trusted starting point. Indeed, any path from a given node down-and-back to a given trusted starting point is also usable.

Most often, the node storage structure requires memory protection. This protection may be reinforced with hardware techniques. These are not a subject of the present invention.

DETAILED DESCRIPTION OF THE INVENTION

This invention provides methods and structures for securely downloading and executing hierarchically dependent code from mutually suspicious authorities. This is accomplished while also preserving the ability to authenticate and to recover from penetration. This is described by a group of scenarios. An implementation method is presented for each scenario. In these scenarios, the device stops normal execution in order to respond to a command request. The implementation includes some careful steps as follows. The command requests a change to a particular NODE-B in the device. The response is performed in one or more nodes that NODE-B and/or one or more of its ancestors (precede or equal NODE-B) in the Security Dependency Graph, by the software that is current before the change is effected. The response is structured so that failures during the response computation leave the device in a safe state. For example, suppose an untrusted download into NODE-B triggers deletion of NODE-C, but a power failure occurs before the deletion is implemented. When computation resumes, the then pre-existing trusted code ensures that deletion is safely completed before the new code in NODE-B can execute.

Figure 1B:
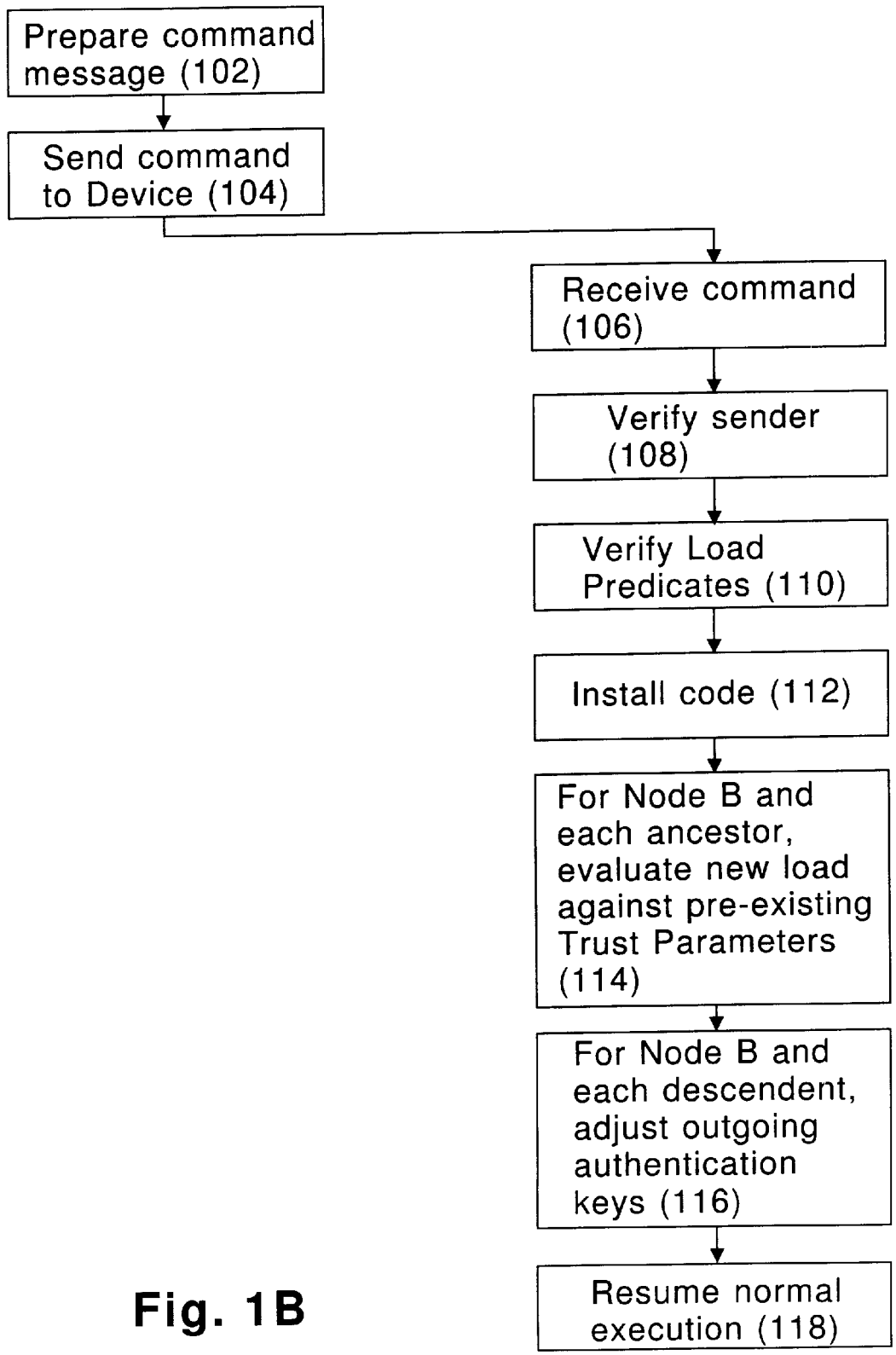
FIG. 1B shows an implementation for downloading code into an existing NODE-B by the authority of NODE-B in accordance with the present invention.

An implementation for downloading code into an existing NODE-B by the authority of NODE-B is shown in FIG. 1B. It is assumed that the authority over an existing node, NODE-B, wishes to download code into that node via their direct authority. This is as opposed to an indirect download, through some other authority as is the scenario described subsequently with FIG. 2. Returning to FIG. 1B, NODE-B's authority prepares a command message consisting of several elements (102). These elements include the new code, the load predicates and a set of trust parameters. The load predicates include specific requirements which the execution environment must satisfy in order for the new code to be able to run. The set of trust parameters include specific requirements which any subsequent changes to the execution environment must satisfy in order for the code to continue to be able to run after these changes.

Then, the authority sends this command to the device (104), which receives it (106). The device verifies (108) that this command came from an authority allowed to request it, i.e., the NODE-B authority. To perform this verification, the device uses the authentication mechanism it has stored for the NODE-B authority. This is done in one of several ways. In one method, the device uses a public key it has stored for the NODE-B authority to verify a signature that this authority has produced and communicated along with the command. Alternatively, the device and the requesting authority perform shared-secret mutual authentication protocol, such as in the "SKA" technique. This is most often done for scenarios where the public-key technique is not possible. If the authentication protocol is interactive, then the Authority needs to participate in the authentication.

The device then verifies that the Load Predicates are valid (110) for the current execution environment. This procedure normally follows the organization of the predicates. It might, for example, include evaluating issues such as determining if the Load Predicates specify a set of permitted devices for this command, and if this device a member of that set. It may also determine if the Load Predicates specify a set of permitted NODE-B code versions. If yes, is the version now in this device a member of that set? The device may also determine for each NODE-A that is an ancestor of NODE-B in the security dependency graph, if the load predicates specify a set of permitted owning authorities and/or code versions. If yes, are the authority and/or code version now associated with NODE-A in this device a member of this set?

If the load predicates are satisfied, the device then installs (112) this code into NODE-B, and marks the state of the NODE as loaded and runnable. However, loading this new code into NODE-B constitutes a change in the execution environment for NODE-B, and all of its descendants in the security dependency graph. Hence, before the device can actually resume execution of the code in any of these nodes, it must evaluate the impact of this change.

This evaluation (114) proceeds as follows. For each NODE-C that descends from (or equals) NODE-B in the device SDG, the device evaluates the change in NODE-B against the trust parameters previously loaded for NODE-C. These trust parameters establish a function from each possible combination of a load scenario for Node-B, and circumstances for NODE-C, and each node (if any) between NODE-B and NODE-C to take particular courses of action for NODE-C. These courses of action may include to continue executing as if nothing happened, to clear existing sensitive data for NODE-C and resume executing from a fresh start, to transfer NODE-C to be a child of a different ancestor than its current parent, and to clear existing sensitive data, and to make NODE-C unrunnable.

After this evaluation and response, the device then adjusts outgoing authentication keys to reflect this change, as follows (116). For each NODE that descends from (or equals NODE-B), the device erases that node's outgoing authentication key. If the node is still runnable, the device generates and certifies a new outgoing authentication key for that Node.

At this point, the load process is complete, and the device may resume normal execution, with this new and/or modified code (118). The device may optionally generate one or more receipts attesting to the changes that have just occurred. Such messages are most often authenticated by using the outgoing authentication technique of the node that performed the loading.

Figure 2:
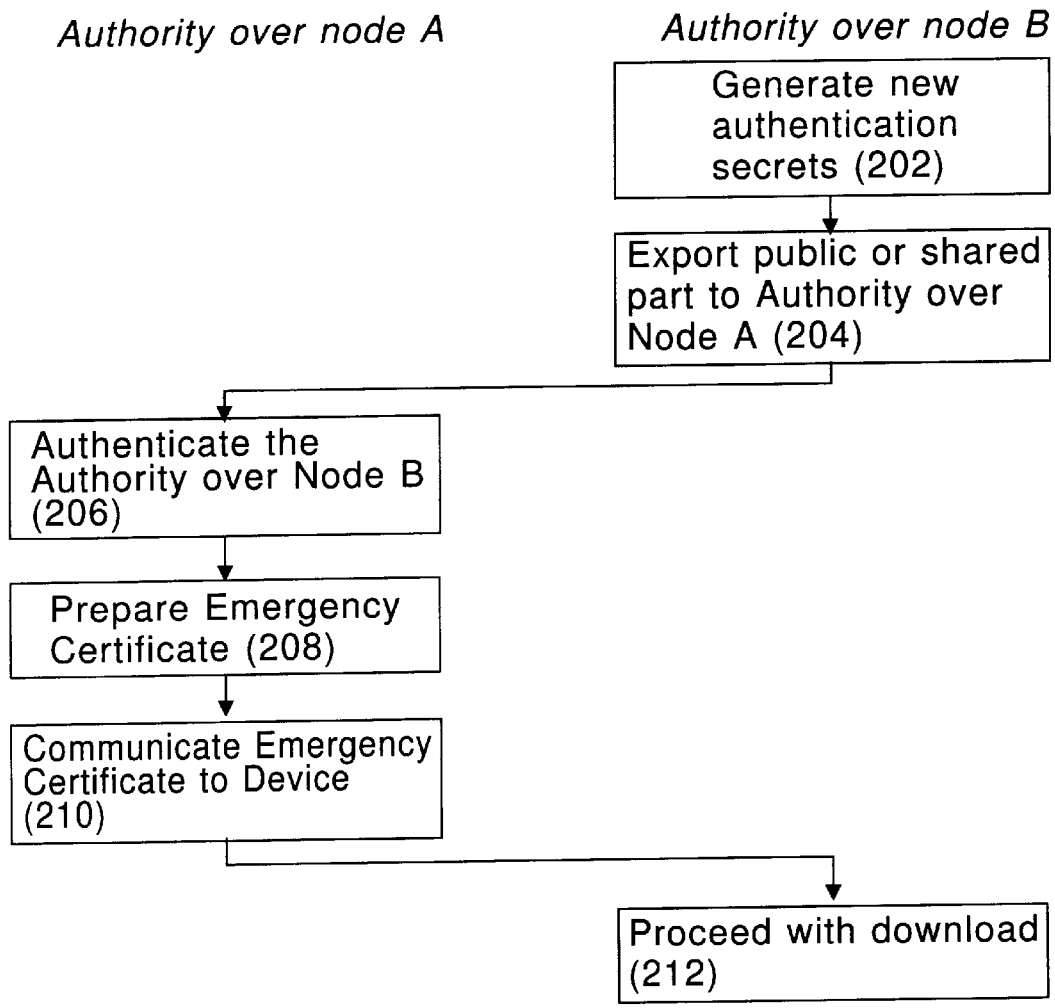
FIG. 2 shows the scenario for downloading code into an existing NODE-B, by the authority over NODE-A, an ancestor of NODE-B.

FIG. 2 shows the scenario for downloading code into an existing NODE-B, by the authority over NODE-A, an ancestor of NODE-B. In this case it is supposed that the authority over an existing node NODE-B wishes to download code into that node indirectly. This is done with the assistance of an authority over another node, (say NODE-A) that is an ancestor of NODE-B in the security dependency graph. This is used for example, when the authority over NODE-B has accidentally erased its private authentication secrets or when NODE-B is newly created and does not yet contain an incoming authentication key.

First, the authority over NODE-B selects an authentication method and generates new incoming authentication secrets (202) and it communicates part or all of these secrets to the authority over NODE-A (204). The authority over NODE-A authenticates (via whatever technical means it deems appropriate) that this communication originated with the genuine authority over NODE-B (206). Then, the authority over NODE-A prepares an "emergency certificate" (208) containing the name of the authority over NODE-B and the authentication method and shared/public key for the authority over NODE-B The authority over NODE-A then communicates this emergency certificate to the device (210). If both the authority over NODE-A and the authority over NODE-B use public key cryptography as their incoming authentication method, then this communication may occur indirectly. The emergency certificate can be sent to the authority over NODE-B, who then forwards the certificate to the device along with the load command.

The authority over NODE-B then proceeds to load code (212) via a method such as that shown in FIG. 1B, with the following exceptions. In this case, the process of "verifying sender", FIG. 1, (108) verifies the load command against the information in the emergency certificate, not against the information in NODE-B. The verification also include verifying that the emergency certificate was indeed produced by the authority over NODE-A. Another exception is that the function used in the evaluation step, FIG. 1B, (114) may explicitly reflect that this load occurred indirectly, via the authority over NODE-A.

Figure 3:
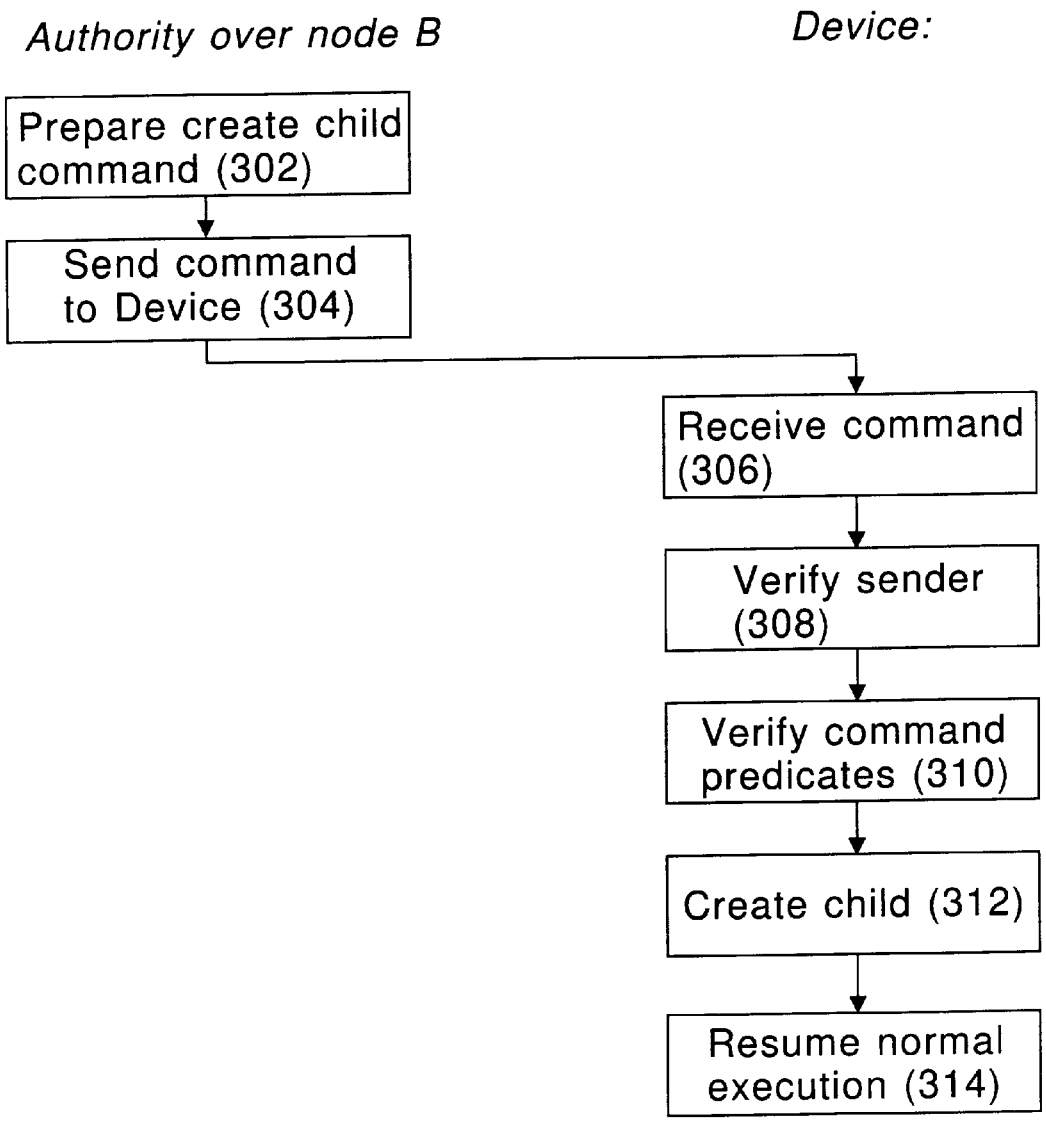
FIG. 3 shows a scenario for creating a child NODE-C of an existing Node B, by the authority over Node B in accordance with the present invention.

A scenario for creating a child NODE-C of an existing Node B, by the authority over Node B is shown in FIG. 3. To create a new child of an existing Node B, the authority over NODE-B first prepares a "Create Child" command for the device (302). This command includes identifiers such as the name of the new child, the name of the new child's authority, and the command predicates.

The command predicates, include specific requirements that the execution environment of NODE-B must satisfy in order for the new command (create-child) to be carried out. The NODE-B authority sends (304) this command to the device, which receives it (306). The device verifies the sender of (308) this command to ascertain that the command came from an authority allowed to request it. To perform this verification, the device uses the authentication mechanism it has stored for the authority over that node, namely NODE-B authority. The device then verifies that the command predicates are valid (310) for the current execution environment of Node B. This procedure is the same as the procedure for evaluating the load predicates in the standard Download Scenario (FIG. 1B). If the predicates are satisfied, the device creates the requested child (312).

Several options exist for the initial state of this newly created child. These options include making the child "unrunnable," and containing no code or authentication secrets. Alternatively, the child may be pre-loaded with incoming authentication secrets sent in the command, or the child may be pre-loaded with incoming authentication secrets and code sent separate from the command. Once the child is created, normal execution resumes (314). It is noted that just as with downloading code, the create-child command could also be requested indirectly via the authority over an ancestor NODE-A.

Figure 4:
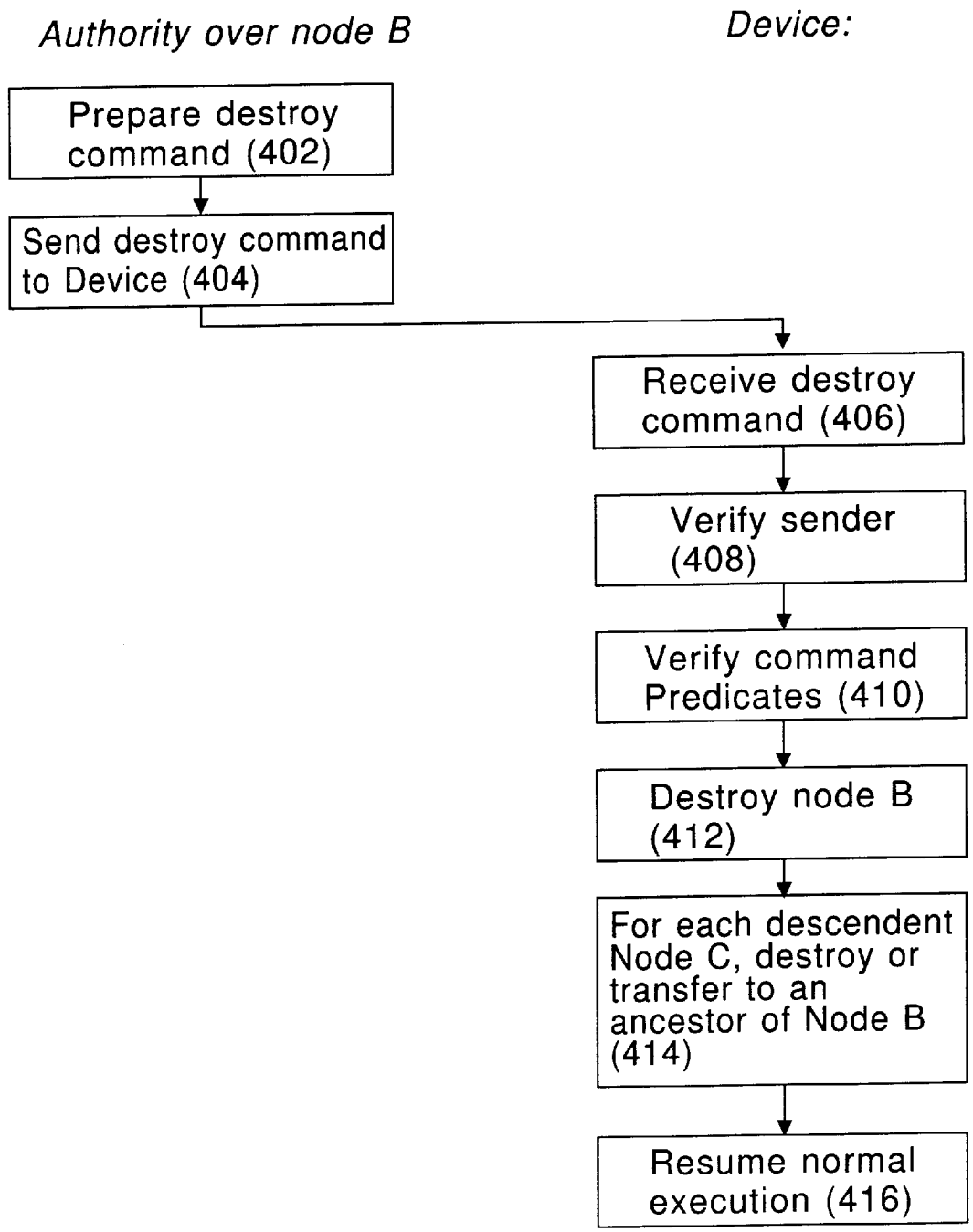
FIG. 4 shows an implementation procedure for a scenario for the authority over NODE-B to destroy an existing NODE-B.

An implementation procedure for a scenario for the authority over NODE-B to destroy an existing NODE-B is shown in FIG. 4. The authority over NODE-B first prepares a "Destroy" command for the device (402). The command includes command predicates, which include specific requirements of which the execution environment of NODE-B must satisfy in order for the destroy command to be carried out. The authority sends (404) the destroy command to the device, which receives it (406). The device verifies (408) that this command came from an authority allowed to request it. The device performs this verification, by using the authentication mechanism it has stored for the authority over that node. The device then verifies that the command predicates are valid (410) for the current execution environment of NODE-B. This procedure is the same as evaluating the load predicates in the standard download scenario (FIG. 1B). If the predicates are satisfied, the device then destroys NODE-B and all its data (412).

For each descendent NODE-C of NODE-B, the device either destroys NODE-C and all its data or alternatively transfers NODE-C to become a child of an ancestor of NODE-B (414). This depends on policy. If an option is allowed, the choice could be determined by the trust parameters in NODE-C. Normal device execution then resumes (416). It is noted that when the destroy node command could also be requested indirectly, via an authority over an ancestor NODE-A. Directly or indirectly, this is best carried out atomically and in a failsafe manner, even if interrupted by such things as a power failure.

Figure 5:
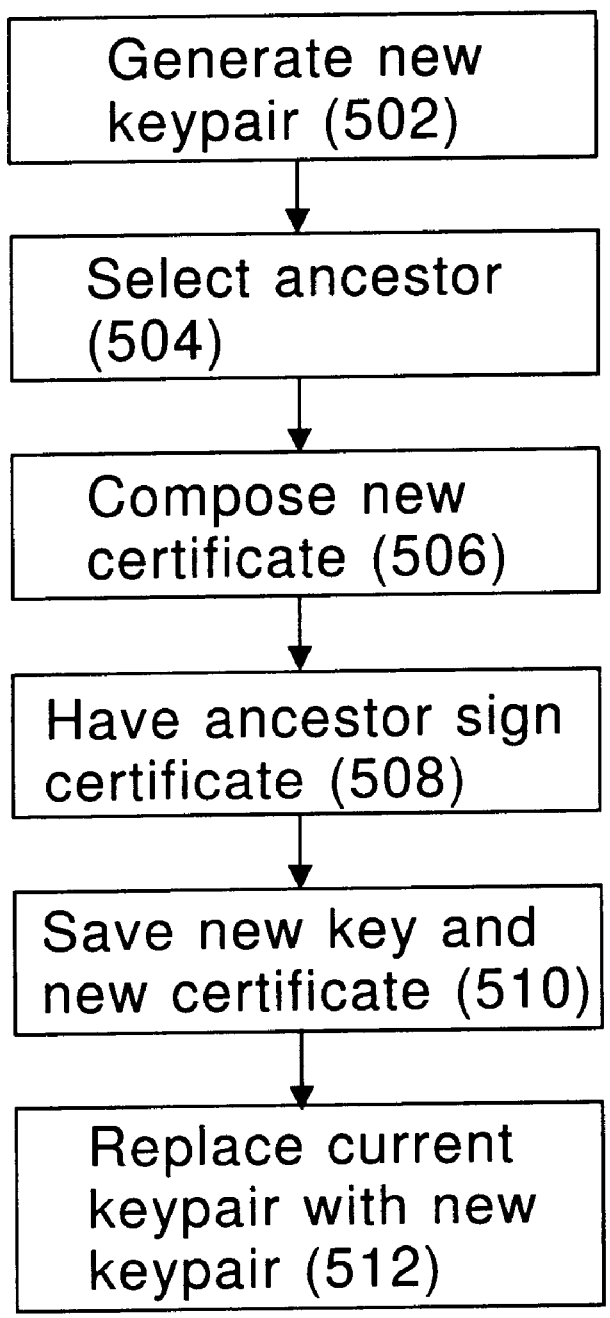
FIG. 5 shows an implementation scenario for regenerating an outgoing authentication Key for Node B, if B or an ancestor has public-key ability in accordance with the present invention.

FIG. 5 shows an implementation scenario for regenerating an outgoing authentication Key for Node B, if NODE-B or an ancestor of NODE-B has public-key ability. In the implementation shown in FIG. 5, the device first generates a new keypair for NODE-B (502) using a key generator technique known to those skilled in the art. The device selects a pre-existing ancestor, NODE-A, that uses public-key cryptography for its outgoing authentication technique (504). The devices composes a new certificate for the new outgoing public key of NODE-B (506). This certificate includes the new public key for NODE-B, identifying information for the authority over each NODE-C, and the code currently in NODE-C. NODE-C is any node in the device's security dependency graph path from NODE-A up to and including NODE-B. The device signs this new certificate with the current outgoing private key of ancestor NODE-A (508). The device then completes the process by saving the new public key for NODE-B and the new certificate in the appropriate memory (510), and atomically making the new keypair the "active" pair for node B, while deleting the old private key (512).

Generally, the key for a node is regenerated when the environment of that node changes. Regeneration ensures that post-change messages are always distinguishable from pre-change messages. However, the delegated signing approach of FIG. 6, can also provide this property.

Figure 6:
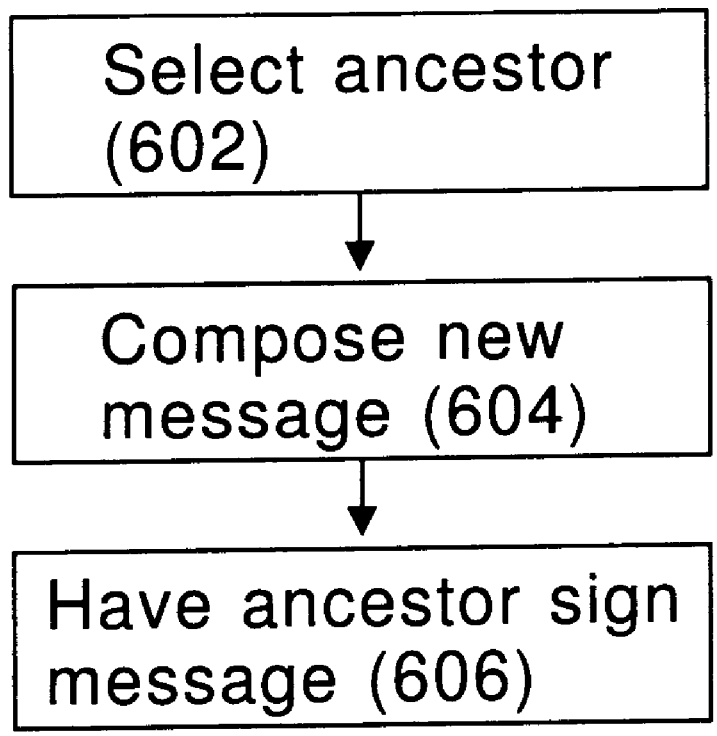
FIG. 6 shows a second option for regenerating an outgoing authentication key for NODE-B in accordance with the present invention.

FIG. 6 shows a method for a device to ensure that messages from a first node before a change in its execution environment occurs are distinguishable from messages from said first node after such a change occurs, said method comprising. This implementation can provide a similar service by avoiding to ever create a keypair for NODE-B. First, the device selects a pre-existing ancestor NODE-A that uses public-key cryptography for its outgoing authentication technique (602). Then, whenever NODE-B needs outgoing authentication on a message, say message M1, NODE-A composes (604) a message M2 containing message M1. Also for each NODE-C in the Security Dependency Graph path from NODE-A up to and including Node B, message M2 includes identifying information for the authority over NODE-C and the code currently in NODE-C. The device signs message M2 with the current outgoing private key of ancestor NODE-A (606).

Figure 7:
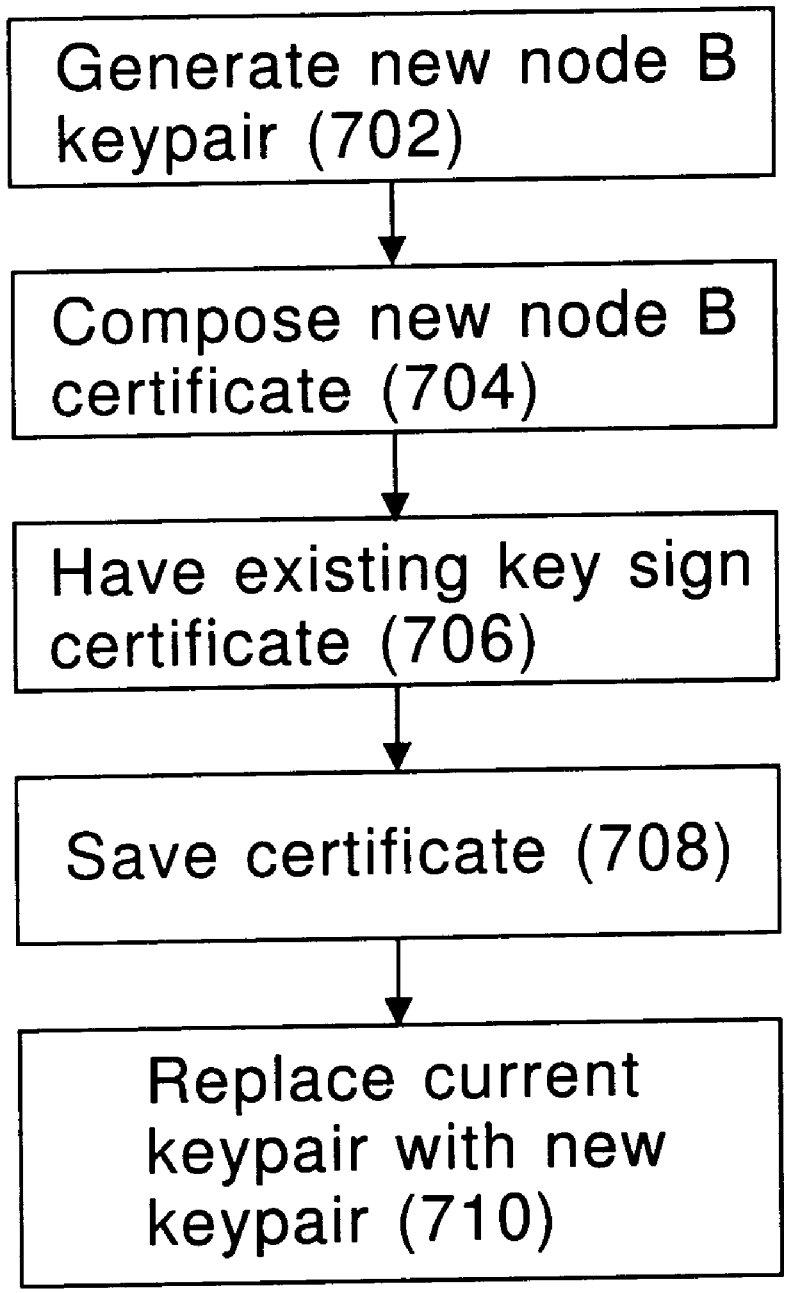
FIG. 7 shows the steps for regenerating an outgoing authentication key for NODE-B, if NODE-B or an ancestor has public-key ability, and if the previous version of the code at NODE-B was trusted in accordance with the present invention.

The steps for regenerating an outgoing authentication key for NODE-B, if NODE-B or an ancestor has public-key ability, and if the previous version of the code at NODE-B was trusted are shown in FIG. 7. This technique can be used for regeneration scenarios when the old version of NODE-B is trusted and still available, and when the software execution environment of Node B either does not change, or changes atomically with the keypair replacement (710). This can occur both for downloads of updated code into B, as well as for simple renewal of NODE-B's key.

First, the device generates a new keypair for NODE-B (702). The device composes a certificate for the new outgoing public key of NODE-B (704). This certificate includes the new public key for NODE-B, and identifying information for the authority over NODE-B and the code for both the previous and the new version of NODE-B. The device signs this certificate with the current outgoing private key of NODE-B (706). It then completes the process by saving both the new public key for NODE-B and this certificate in the appropriate memory (708). The device atomically makes the new keypair the "active" pair for node B, and deletes the old private key (710).

It is noted that this invention has direct applications to secure code downloading in generic, general-purpose computer systems, such as network computers. However, it is ideally suited and was developed for tamper-respondent general-purpose secure coprocessors: where the physical encapsulation prevents any direct access of the internal state; where the integrity of that state and the authenticity of the device and its software configuration is critical for security; and where the software has sufficient complexity to merit multiple levels of code of sufficient complexity and richness to be probably permeable. Examples include banking systems, automated payment systems, and sensitive code in industrial, educational, govermental and defense applications.

In particular, the invention provides several very useful properties. It provides authenticity of code execution, in which, with a minimal amount of trust, a third party can always distinguish between a message allegedly from a certain software execution environment in a certain hardware environment, and a message from a clever adversary. It provides authenticity of device wherein an untampered coprocessor can always prove it is untampered, despite arbitrarily evil code running in any downloadable node. It also provides recoverability from penetration wherein an untampered coprocessor can always recover arbitrarily evil code running in any downloadable node.

Figure 8:
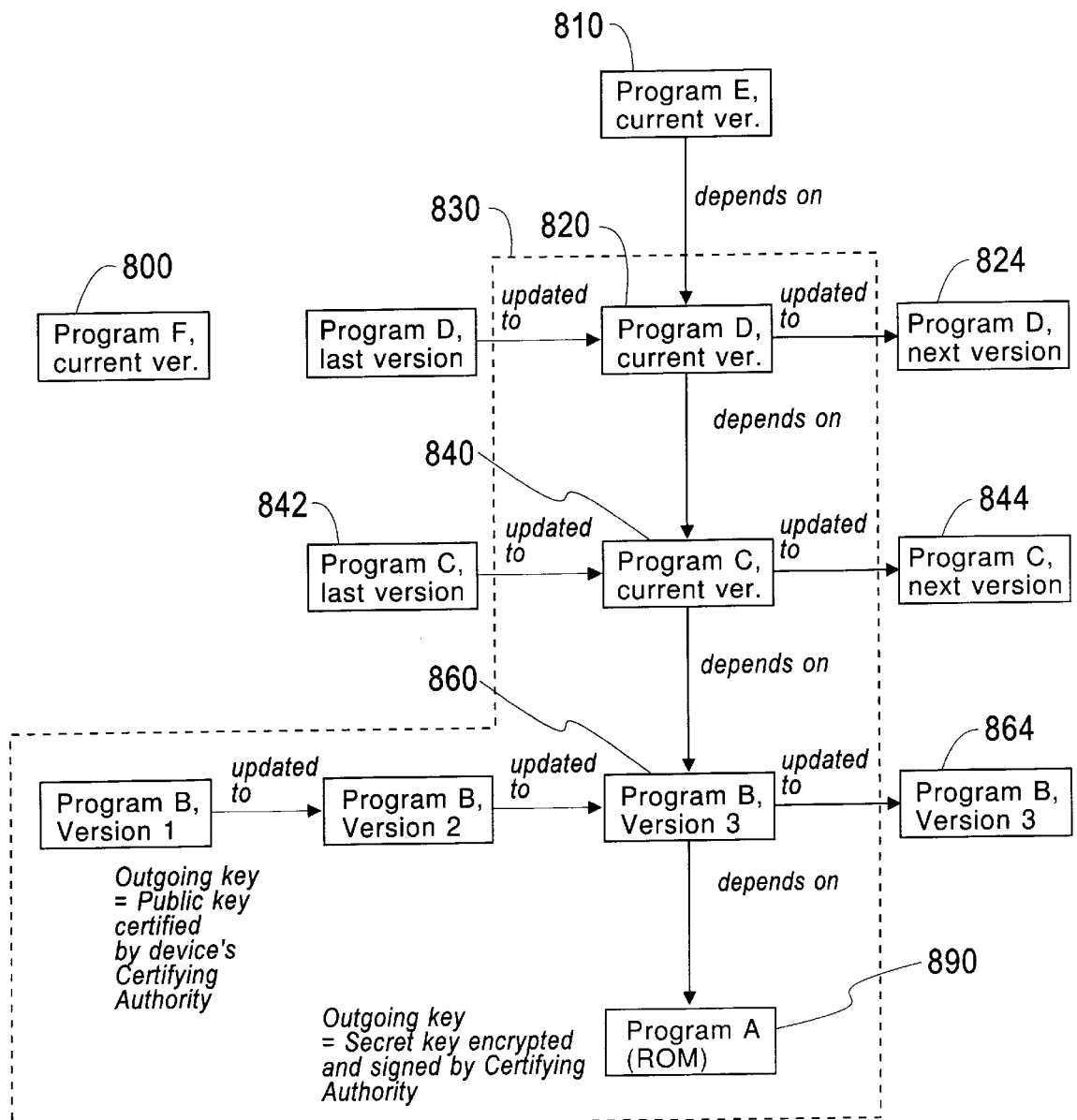
FIG. 8 shows the authentication properties this invention provides for devices with a straightline dependency graph whose root is ROM and whose public-key signature services are carried about by the root's child.

FIG. 8 illustrates the authentication properties this invention provides for devices with a straightline dependency graph whose root is ROM and whose public-key signature services are carried about by the root's child. Suppose a message 'M' is allegedly sent by a particular version of Program 'D' 820, running in a particular software environment. Program 'D' 820 is running on top of a particular version of Program 'C' 840. Program 'C' 840 is running on top of a particular version of Program 'B' 860, which is running on top of particular version of Program 'A' 890. Further, Program 'D' 820 is allegedly running in a particular trusted hardware environment, whose initial Program 'B' 860 outgoing key was certified by a certifying authority, and whose Program 'B' 860 code has undergone a specific series of revisions since certification.

Program 'F' 800, running a completely different device, has to verify that message 'M' came from this alleged sender, namely Program 'D', 820. In order for Program 'F' 800 to believe this message came from this environment, it is necessary that Program 'F' trust that all the code inside the dashed-line in FIG. 8 behaves correctly. That is to say, if Program 'F' 800 does not trust something in the box to behave correctly, then it cannot believe the message from this instance of Program 'D', 820.

However, the method of the present invention ensure that for Program 'F' 800 to believe this message came from this code in this environment, it is sufficient that it trust only the code inside the dashed box 830. It does not need to trust anything other than what is strictly necessary.

In particular, Program 'F' 800 need to trust the versions 842 of Program 'C' that may have been running at the device before the current version 840 was; nor versions of Program 'B' 864, 'C' 844, or 'D' 824 that might get loaded later, nor any version of Program 'E' 810. It is noted that an approach the did not follow the invention method of destroying and regenerating keys, would permit later versions of programs to impersonate earlier versions. So Program 'F' 800 could not reliably distinguish between the alleged Program 'C' 840, for example, and a malicious later version of Program 'C' 844. An approach that did not follow the present invention's method for establishing the trust chain, would permit an earlier version of the alleged 'C; to impersonate later ones.

As a consequence, this method provides the ability to recover from penetration. If any of the rewritable nodes except Program 'B' 860 are corrupted, the device is recovered and authenticated by using public-key technology alone. If Program 'B' 860 is corrupted the device is recovered using secret-key techniques from Program 'A' 890. These properties are especially useful when the underlying device is a physically secure coprocessor whose contents cannot be directly examined.

Computer system embodiments can take many forms. For instance, it may include a loader with at least two rewritable nodes. It may include a loader having at leats two nodes with keys. The loader tasks may actually be performed by different nodes, and the node(s) that perform the loading tasks may change depending on the command. The invention may be implemented in software and hardware combinations. The term subdevice is herein employed as an implementing device in software, hardware or both. In some embodiments, the hardware/software distinction is not critical. Hardware implementations are employed especially when speed of performance is important.

Figure 9:
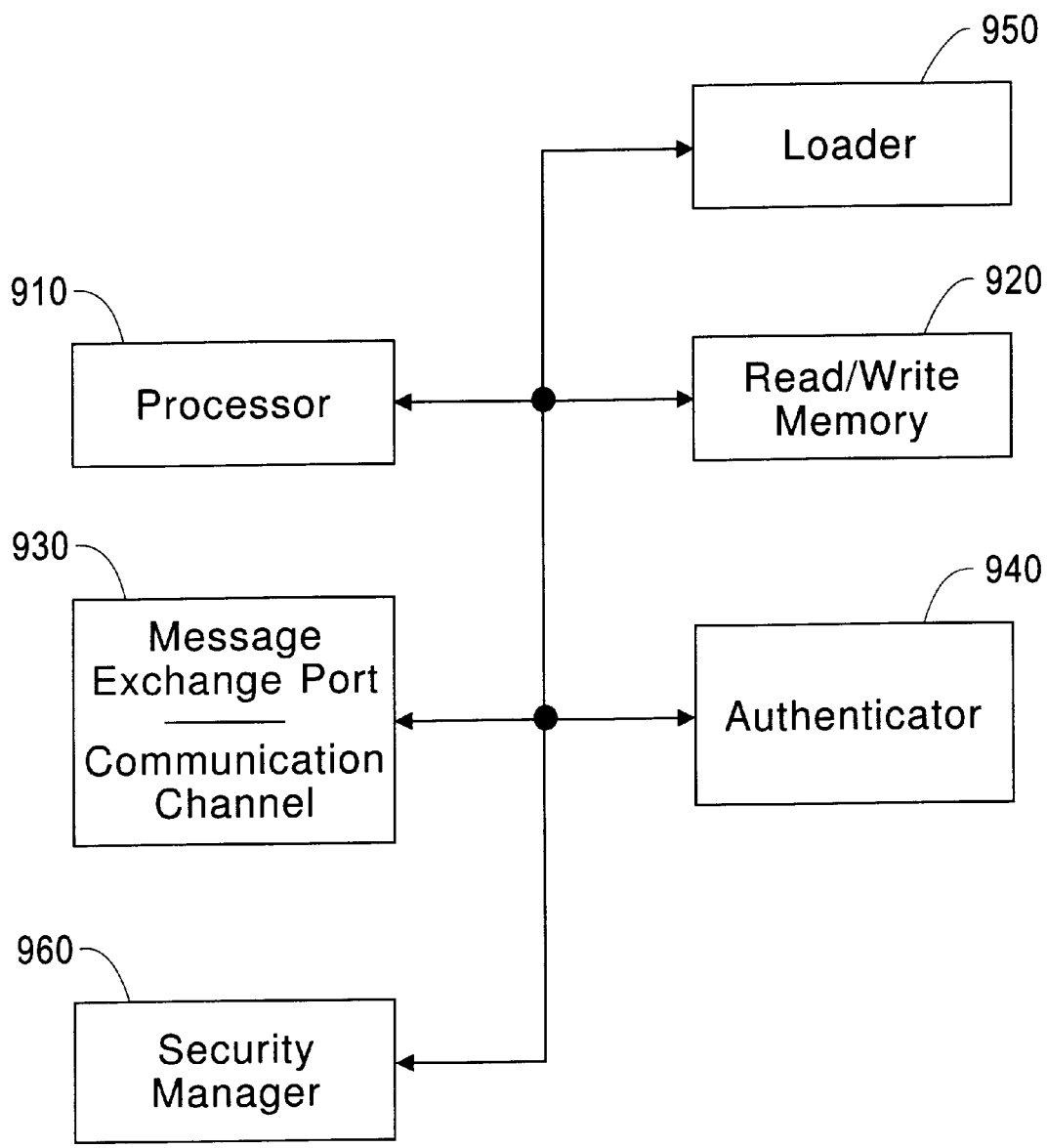
FIG. 9 shows a computer system embodiment of the present invention.

FIG. 9 shows a computer system embodiment of the present invention. The computer system includes a processor 910; a read/write memory 920 for storing instructions and data for the processor; a communication channel 930 for exchanging message signals between the processor and external devices; an authenticator 940 for determining whether incoming message signals to the processor are authorized by a trusted authority; a loader 950 for loading programs into the read/write memory; a security manager 960 for authorizing the loader to load a new program into the memory only if the authenticator determines that the new program is authorized by a trusted authority.

In some embodiments the system further includes an operating system or application program in the read/write memory. The operating system or application program is "dependent" on the loader, wherein said new program is "dependent" upon both the loader and the operating system or application program, and wherein said trusted authority includes in combination a first influence of a first authority over the loader and a second influence of a second authority over the operating system or application program.

An alternate combination for the computer system is a system that includes a coprocessor; a port for exchanging message signals between the processor and external devices; a ROM memory for storing a loader program executable by the processor, (the loader program containing a cryptographic key for decoding incoming message signals from a trusted authority over the loader program, and containing a second cryptographic key for encoding outgoing message signals from the loader program); a second memory for storing instructions and data for the processor, and for storing a first child program which calls one or more of the functions provided by the loader program, said first child program including a first child cryptographic key for decoding incoming message signals from a second trusted authority over the first child program, and including a second cryptographic key for encoding outgoing message signals from the first child program. Sometimes the loader program is a verification program which includes code to verify an integrity level of said child and updated child secrets and/or the first child program includes code for an interchange of sensitive data.

Alternatively the computer system comprises a processor; a communication channel for exchanging message signals between the processor and external devices; a first memory storing a loader program executable by the processor, (the loader program containing a first cryptographic key for authenticating incoming message signals from a first trusted authority over the loader program, and containing a second cryptographic key for authenticating outgoing message signals from the loader program); a second memory for storing instructions and data for the processor, said second memory storing a first child program which depends upon the loader program. The first child program containing a first child cryptographic key for decoding incoming message signals from a second trusted authority over the first child program, and containing a second cryptographic key for encoding outgoing message signals from the first child program. Sometimes the loader program is a program including code to destroy sensitive data and/or the first child program includes code for verifying an integrity level of the loader.

Figure 10:
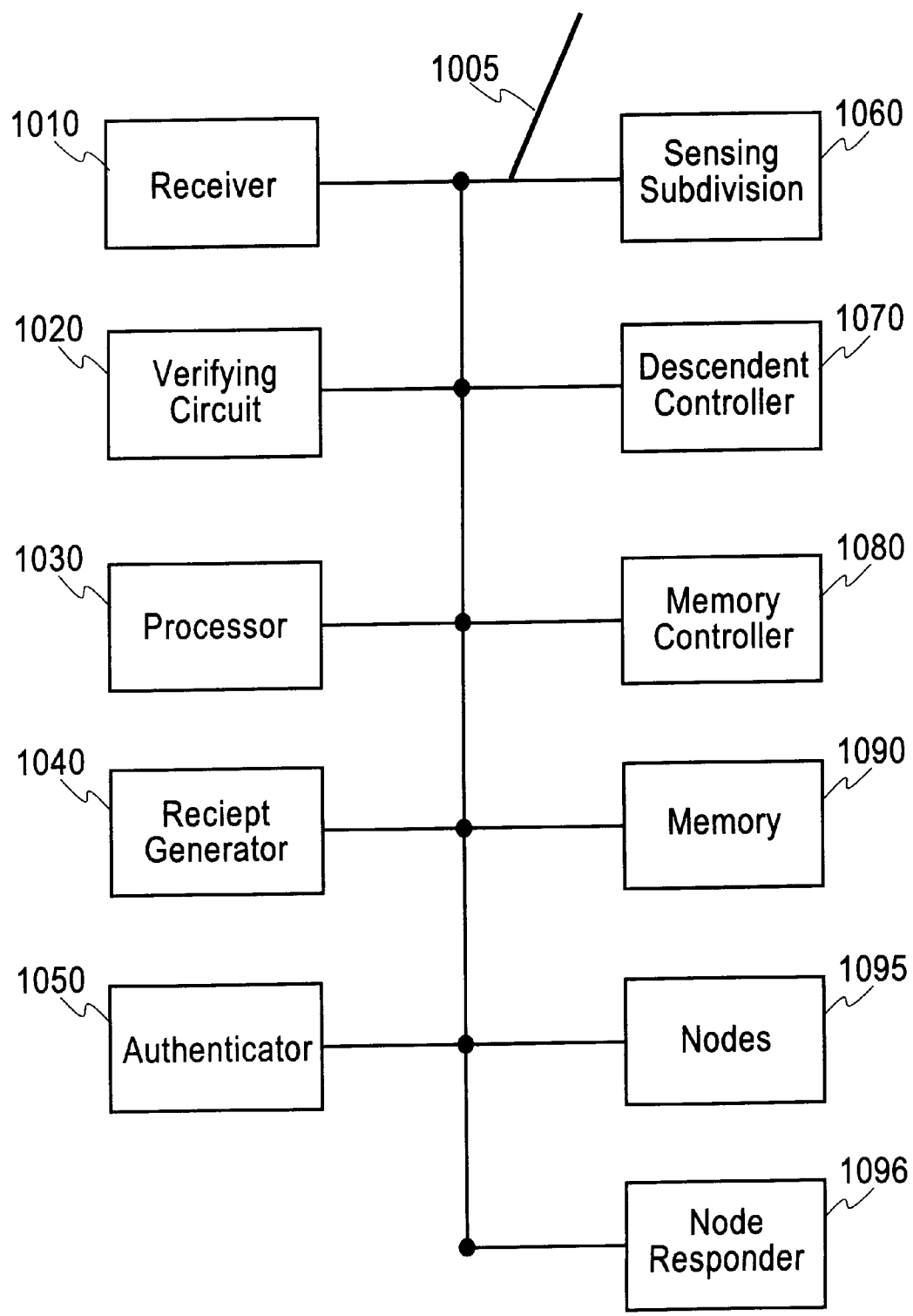
FIG. 10 shows an embodiment of an apparatus in accordance with the present invention.

FIG. 10 shows an embodiment of an apparatus in accordance with the present invention. TBD)

The apparatus, system and methods presented solve the problem of code-downloading in the full generality of complex code dependencies. These methods account for the implications of mutual distrust and hot-swapping, and formalize and achieve the security and authentication requirements for downloadable code in this context.

These subdevices are implemented as known to those skilled in the art and/or described in the following referenced documents which are incorporated herein by reference: U.S. Pat. No. 4,860,351, entitled, "Tamper-Resistant Packaging for Protection of Information Stored in Electronic Circuitry", by S. H. Weingart, issued Aug. 22, 1989; U.S. Pat. No. 5,159,629, entitled, "Data Protection by Detection of Intrusion into Electronic Assemblies", by G. P. Double and S. H. Weingart, issued Oct. 27, 1992; Federal Information Processing Standards Publication 140-1, "Security Requirements for Cryptographic Modules" U.S. Department of Commerce/National Institute of Standards and Technology, Jan. 11, 1994; "Applied Cryptology", by B. Schneier, 2nd edition, Wiley and Sons, N.Y., 1996, ISBN # 0-471-12845-7. These are incorporated herein for many purposes, including the enablement of the systems and subcircuits in the present invention.

This invention includes the following security procedures. It provides a procedure wherein an authority signs code from someone else, but upon which that authority depends in order to establish whether a 'trusted execution environment' is being preserved. It also provides the procedure of using code that is already trusted to ensure that proprietary data is destroyed when a change causes the trusted execution environment to cease holding for a certain level. A procedure is also provided for using a carefully constructed key structure to ensure that communications allegedly from particular code in particular environment can be authenticated as such. It also describes a procedure for caring for the authenticity of the code that decides the authenticity of public-key signatures, and/or the authenticity of other code. Methodology is also provided for physically secure coprocessors with multiple levels of dependent software that is independently downloadable by mutually suspicious authorities, and for physically secure coprocessors whose software has sufficient richness and complexity so as to be certainly permeable, and for recoverability of physically secure coprocessors from code of arbitrary evil, running at arbitrary privilege.

The general reloading problem is the following. In the general case, we can construct a security dependency graph, consisting of a node for each program/segment, and directed edges connecting each node to the nodes it depends on. Secure and correct operation of a node depends on the programs in that node and its ancestors. So, loading a program into a particular node requires addressing two questions. The first question is, will this new program operate safely and securely in this computational environment? It is noted that dependencies exist on the programs currently in its ancestor nodes, and on the device itself. The second question is, will loading this new program disrupt the safe and secure operation of the programs currently in its descendant nodes? Furthermore, the loading scheme must deal with some additional facts. Indirect Authentication may be necessary. The card may not necessarily be able to directly authenticate a request from the authority over a node. (E.g., because the node is still blank, and has no public key stored with it). Another consideration is trusting the loader. Both the old and new versions of a program have security dependency on the software that evaluates and performs the reloading.

It is noted that this invention may be used for many applications. Although the description is made for particular arrangements and applications, the intent and concept of the invention is suitable and applicable to other arrangements and applications. It will be clear to those skilled in the art that other modifications to the disclosed embodiments can be effected without departing from the spirit and scope of the invention.

What is claimed is:

1. A method for a node's authority to download new code into an existing node within a device, said method comprising:
   said authority preparing a command message including the new code, load predicates and trust parameters, where the load predicates specify whether a current environment in said device is a secure environment for said code;
   said authority communicating said command message to the device;
   said device receiving said message;
   said device verifying that said message originated from said authority, and verifying that the current environment is valid for said load predicates; and
   downloading said code if said message is verified to have originated from said authority, and said current execution environment is valid for said load predicates.

2. A method as recited in claim 1, wherein said existing node has at least one descendent node, said method further comprising:
   evaluating for each said descendent node a change in an environment of said existing node resulting from said step of loading by comparing said environment against stored trust parameters for said descendent node;
   determining if said change is acceptable for said trust parameters and;
   executing said code if said step of determining proves said change to be acceptable, or clearing sensitive data from said descendent node otherwise.

3. A method as recited in claim 2, further comprising:
   said device adjusting at least one of its outgoing authentication keys to reflect said change.

4. A method as recited in claim 3, further comprising:
   said device erasing an original outgoing authentication key of said descendent node;
   said device generating and certifying a new outgoing authentication key for said descendent node.

5. A method as recited in claim 4, further comprising the steps of said device generating at least one receipt attesting to said change.

6. A method as recited in claim 5, further comprising authenticating said receipt using an outgoing authentication technique of the existing node.

7. A method as in claim 6, further comprising atomically completing said command and using a software environment that existed before said load was requested.

8. A method as in claim 1, further comprising:
   maintaining said device in a safe state following a power failure.

9. A method as in claim 2, further comprising:
   maintaining said device in a safe state following a power failure, and
   sensing an untrusted download into said existing node triggering deletion of each of said descendent nodes even when recovering from a power failure.

10. A method as recited in claim 1, wherein said trust parameters include requirements which a subsequent change to an execution environment must satisfy in order for the code to continue to be able to run after said subsequent change.

11. A method as recited in claim 1, wherein said step of verifying includes having the device use a public key it has stored for said authority to verify a signature that said authority has produced and communicated along with said command message.

12. A method as recited in claim 1, wherein said device is a smart card.

13. A device as recited in claim 1 wherein said new code includes a new incoming authentication key for said node's authority.

14. A method as recited in claim 1, wherein said load predicates include requirements which an execution environment must satisfy in order for the new code to be able to run.

15. A method as recited in claim 11, wherein the step of verifying that said message originated from said authority includes a method of incoming authentication using public key cryptography, and said step of preparing said requirements employs a method of identifying acceptable code, said method of identifying acceptable code including hashing, and wherein an inclusion of said requirements in the command constitute one authority signing code belonging to another.

16. A method as recited in claim 14, wherein said environment requirements which an execution environment must satisfy include:
   for the existing node and each of its ancestors, an identification of a particular authority owning each node and an identification particular acceptable code in each node.

17. A method as recited in claim 16, wherein said environment requirements which an execution environment must satisfy further includes a specification of a particular family of devices deemed acceptable.

18. A method for an authority over a parent node in a device to create a child node of said parent node, said method comprising:
   said parent authority preparing a create child command for said device,
   said command including command predicates;
   said authority sending said command to said device;
   said device receiving said create child command;
   said device verifying a source of said command;

said device creating said child if the predicates are satisfied and said source is said parent authority.

19. A method as recited in claim 18, further comprising making an initial state of said child to be unrunnable and to contain no code or authentication secrets.

20. A method as recited in claim 18, further comprising pre-loading said child with incoming authentication secrets sent in said command.

21. A method for a node authority to send a command to an existing node in a device, said method comprising:
said node authority preparing the command for the device, said command including command predicates;
said node authority sending the command to the device;
said device receiving the command;
said device verifying a source of said command;
said device verifying that the command predicates are valid for a current execution environment of said node; and
implementing said command if said source is verified to be said node authority and if the predicates are satisfied.

22. A method as recited in claim 21, wherein said command is a command to destroy the existing node.

23. A method as recited in claim 21, wherein said command predicates include requirements which the execution environment of said node must satisfy in order for said command to be carried out.

24. A method as recited in claim 23, wherein a method for incoming authentication is a public key method for the existing node, and a method for identifying acceptable code for the existing node includes hashing, said method further comprising allowing one authority to sign code belonging to another authority when the command includes such requirements.

25. A method as recited in claim 23, wherein said command is a command to destroy said existing node, and said existing node has at least one descendent, said method further comprising destroying each descendent of said node and erasing sensitive data in each said descendent.

26. A method as recited in claim 25, wherein said requirements which the execution environment of said node include, for the node being destroyed and each of its ancestors, an identification of a particular authority owning the node, and an identification particular acceptable code in the node, and a specification of a particular family of devices deemed acceptable.

27. A method for a device having a security dependency graph to regenerate an outgoing authentication key for a first node said first node having at least one ancestor having public-key ability, said method comprising:
said device generating a new keypair for said first node;
said device selecting said ancestor for its outgoing authentication technique;
said device composing a certificate for a new outgoing public key of said first node, said certificate includes the new outgoing public key of said first node, identifying an authority over each descendent node in said security dependency graph, and identifying code currently held in the descendent node;
signing said certificate with a current outgoing private key of the ancestor;
saving the new public key for the said first node and saving the certificate in an appropriate memory; and
making the new keypair the active pair for the first node while deleting the old private key.

28. A method for a device to ensure that a first message received from a first node before a change in an execution environment of said first node occurs, is distinguishable from a second message from said first node received after said change occurs, said method comprising:
selecting a pre-existing ancestor of said first node;
composing a second message whenever the first node needs outgoing authentication of the first message;
said second message including said first message;
said second message including a first identity of the authority over said first node, and a second identity of the authority over a second node;
said second message including a first identity of the code currently in said first node, and a second identity of the code currently in said second node;
for each node between said first node and said second node in a security dependency graph of said device, said second message includes a first identity of the authority over said third node, and a second identity of the code in said third node;
authenticating said second message with a current outgoing authentication technique of said second node.

29. A method for a device to respond to a first command, said device having a NODE-A and a NODE-B, said NODE-A under the control of a NODE-A authority, said NODE-B under the control of a NODE-B authority, wherein said NODE-A is an ancestor of said NODE-B, and said first command is a request made by said NODE-A authority, said method comprising:
said NODE-B authority:
selecting a command authentication technique, generating new incoming authentication secrets, and
communicating at least part of said secrets and/or keys to said NODE-A authority; and
said NODE-A authority:
authenticating that said step of communicating originated with NODE-B authority,
preparing an emergency certificate which includes a first identification of said NODE-B authority, the selected command authentication technique, and at least a part of said secrets, and
communicating said emergency certificate to the device to enable said device to respond to said first command.

30. A method as recited in claim 29, wherein said command authentication technique and said step of authenticating each employ a public key cryptology technique, said method further comprising:
sending said emergency certificate to said NODE-B authority; and
said NODE-B authority forwarding said emergency certificate to said device along with a second command to perform said first command.

31. A method as recited in claim 29, further comprising:
NODE-B authority
verifying said load command against information in said emergency certificate; and
verifying that the emergency certificate was indeed produces by said NODE-A authority; and
authorizing said device to perform said command.

32. A method as recited in claim 29, further comprising:
NODE-B authority
verifying said load command against information in said emergency certificate; and
verifying that the emergency certificate was indeed produces by said NODE-A authority; and
authorizing said device to perform a different action on the existing node and the descendent node, when the command uses emergency authentication.

33. A method for a device to create a child NODE-C of an existing NODE-B, by an authority over NODE-B; said method comprising:

the NODE-B authority preparing and sending a create-child command to the device, said command includes a name of the new child, a name of the child's authority; and command predicates said NODE-B authority sending the create-child command to the device;

said device receiving the create-child command, verifying that the command came from the NODE-B authority, and verifying that the command predicates are valid for a current execution environment of NODE-B;

creating said child if both steps of verifying are successful, otherwise not creating the child.

34. A method as in claim 33, wherein said child is pre-loaded with incoming authentication secrets sent in the create-child command.

35. A method for securely downloading dependent code from a loading device to a node, said loading device controlled by a first authority, said node controlled by a second authority, said method comprising:

said first authority providing an incoming authentication key of said second authority and an outgoing authentication key for said device;

said second authority allowing said downloading executed in a fashion trusted by said second authority; and said second authority signing said dependent code.

36. A computer system comprising:

a processor;

a memory for storing instructions and data for the processor;

a communication channel for exchanging message signals between the processor and external devices;

an authenticator for determining whether incoming message signals to the processor are authorized by a trusted authority;

a loader for loading programs into the memory;

a security manager for authorizing the loader to load a new program into the memory only if the authenticator determines that the new program is authorized by a trusted authority;

an operating system or application program in the memory said operating system or application program being "dependent" on both the loader and the operating system or application program, and wherein said trusted authority includes a first influence of a first authority over the loader and a second influence of a second authority over the operating system or application program.

37. A computer system comprising:

a processor;

a port for exchanging message signals between the processor and external devices;

a first memory for storing a loader program executable by the processor, said loader program possessing a first cryptographic key for decoding incoming message signals from a first trusted authority over the loader program, and possessing a second cryptographic key for encoding outgoing message signals from the loader program;

a second memory for storing instructions and data for the processor, and for storing a first child program which calls one or more of the functions provided by the loader program, said first child program possessing a first child cryptographic key for decoding incoming message signals from a second trusted authority over the first child program, and possessing a second child cryptographic key for encoding outgoing message signals from the first child program.

38. A computer system as recited in claim 37, wherein said loader program includes code to verify an integrity level of said child and updated child secrets.

39. A computer system as recited in claim 37, wherein said first child program includes code for an interchange of sensitive data.

40. A computer system as recited in claim 37, wherein said loader program is a program including code to destroy sensitive data.

41. A computer system as recited in claim 37, wherein said first child program includes code for verifying an integrity level of the loader program.

42. A computer system comprising:

a processor;

a communication channel for exchanging message signals between the processor and external devices;

a first memory storing a loader program executable by the processor, said loader program possessing a first cryptographic key for authenticating incoming message signals from a first trusted authority over the loader program, and possessing a second cryptographic key for authenticating outgoing message signals from the loader program;

a second memory for storing instructions and data for the processor, said second memory storing a first child program which depends upon the loader program, said first child program possessing a first child cryptographic key for decoding incoming message signals from a second trusted authority over the first child program, and possessing a second child cryptographic key for encoding outgoing message signals from the first child program.

43. An apparatus for downloading new code into an existing node within a secure device, said apparatus comprising:

a receiver for receiving a download command message from an authority, said message including the new code, load predicates and trust parameters;

a verifying subdevice for verifying that the message is valid for said load predicates and for verifying that the message originated with the authority.

44. A secure device having an existing node and comprising:

a receiver for receiving a first command message from an outside source directed to the existing node, said message including first command actions, load predicates and trust parameters;

a verifying subdevice for verifying that the first command message is valid for said load predicates, and for verifying that the outside source is an authority over the existing node; and a processor to implement the first command actions when the first command message is verified successfully.

45. A device as in claim 44, wherein the processor is capable of completing a command in progress following recovery from a power failure, and to maintain the device in a safe state following the power failure.

46. A device as recited in claim 44, further comprising a second subdevice to function to ensure that a change to a node and its descendants occur atomically.

47. A device as recited in claim 46 wherein said second subdevice performs said function despite interruptions and failures.

48. A device as recited in claim 44, wherein said existing node has at least one descendent node, said device further comprising:
   a subdevice to sense a change in an environment of said existing node resulting from an implementation of the first command actions;
   a descendent controller to control a reaction of each descendent node to the change in the environment.

49. A device as recited in claim 48, further comprising: a key generator for generating keys, wherein the existing node and each descendent each have an outgoing authentication key, and wherein the device adjusts at least one outgoing authentication key to reflect the change in the environment.

50. A device as recited in claim 48, wherein at least one descendent has sensitive data, and wherein said sensor upon sensing an untrusted download into the existing node causes deletion of sensitive data in said at least one descendent.

51. A device as recited in claim 48, wherein said action is to generate a new keypair for the descendent node.

52. A device as recited in claim 48, further comprising:
   a memory controller for erasing an original outgoing authentication key of the descendent node, and for certifying a new outgoing authentication key for the descendent node.

53. A device as recited in claim 52, further comprising:
   a receipt generator to generate at least one receipt attesting to the change in the environment; and
   an authenticator for authenticating the receipt using an outgoing authentication technique of the existing node.

54. A device as recited in claim 48, wherein said first command message is a command to create a child node of the existing node.

55. A device as recited in claim 54, wherein an initial state of the child makes the child unrunnable and to contain no code or authentication secrets.

56. A device comprising:
   a NODE-A under the control of a NODE-A authority;
   a NODE-B under the control of a NODE-B authority, wherein NODE-A is an ancestor of said NODE-B;
   a NODE-B receiver for receiving a first command from the NODE-A authority, and for receiving an emergency certification from the NODE-A authority indicating the NODE-A authority authenticated that at least one of NODE-B secrets originated from the NODE-B authority;
   a NODE-B responder for responding to the first command upon receiving permission from the NODE-B authority to prepare and send to the NODE-A authority a first response, where said first response includes at least part of NODE-B secrets, thereby enabling the NODE-A authority to generate and send to NODE-B the emergency certificate.

57. A device as recited in claim 56, wherein the emergency certificate includes a first identification of said NODE-B authority, a second authentication technique, and a shared key for said NODE-B authority.

58. A method for regenerating an outgoing authentication key for a NODE-B, if NODE-B or an ancestor of NODE-B has public-key ability, and if a previous version of the code at NODE-B was trusted, said method comprising the device:
   generating a new keypair for NODE-B which includes a new outgoing public key of NODE-B;
   composing a new certificate for the new outgoing public key of NODE-B;
   signing the new certificate with a current outgoing private key of NODE-B;
   saving both the new public key for NODE-B and the certificate in a memory;
   making the new keypair to be an active pair for NODE-B; and
   deleting an old private key.

59. A method as recited in claim 58, wherein an old version of NODE-B code is trusted and still available, said method being employed for downloads of updated code into B, and for simple renewal of NODE-B's key.

60. A method as recited in claim 58, wherein the certificate includes the new public key for NODE-B, and identifying information for an authority over NODE-B and the code for both the previous and a new version of NODE-B.

61. A method for maintaining the security of a first node controlled by a first authority, said first node dependent on a second node controlled by a second authority, when said second authority issues a command for said second node, where said command changes an execution environment of said first node, said method comprising:
   said first authority explicitly counter-authenticating said command from said second authority as acceptable for said first node;
   destroying said first node and/or deleting its sensitive data when said command arrives without said counter-authentication.

* * * * *